United States Patent [19]

Walker et al.

[11] 4,445,421

[45] May 1, 1984

[54] HELICOPTER SWASHPLATE CONTROLLER

[75] Inventors: Bruce K. Walker, Shaker Heights, Ohio; Mukund Desai, Needham; Eliezer Gai, Somerville, both of Mass.

[73] Assignee: The Charles Stark Draper Laboratory, Inc., Cambridge, Mass.

[21] Appl. No.: 318,690

[22] Filed: Nov. 6, 1981

[51] Int. Cl.³ .................. F01B 3/02; F15B 11/10; F15B 13/16; B64C 11/38

[52] U.S. Cl. ..................................... 91/186; 91/361; 91/363 A; 91/433; 416/114; 416/157 R

[58] Field of Search .......... 416/114, 115, 162, 157 R; 91/506, 186, 189, 363 R, 363 A, 433

[56] References Cited

U.S. PATENT DOCUMENTS

| | | |
|---|---|---|
| 3,246,862 | 4/1966 | Celniker et al. |
| 3,504,989 | 4/1970 | Kisovec . |
| 3,558,082 | 1/1971 | Bennie . |
| 3,570,786 | 3/1971 | Lewis ...................... 416/115 X |
| 3,734,644 | 5/1973 | Garcia . |
| 4,027,999 | 6/1977 | Durno . |
| 4,053,123 | 10/1977 | Chadwick . |
| 4,243,358 | 1/1981 | Carloch et al. ............... 416/114 |
| 4,336,745 | 6/1982 | Lund ........................... 91/433 |
| 4,362,085 | 12/1982 | Venuti, Jr. ................ 91/363 A |

OTHER PUBLICATIONS

Corlock, et al., "Star Flight Control System", Presented at the Flight Control Meeting of the American Helicopter Society, Oct. 1978.

Primary Examiner—Robert E. Garrett
Assistant Examiner—Abram McConnell Bradley, IV
Attorney, Agent, or Firm—Kenway & Jenney

[57] ABSTRACT

A redundant swashplate control system includes five or more actuators coupled to the swashplate. A feedback network independently controls each actuator to track a commanded position and a reference ram differential pressure that it related to the ram differential pressures sensed from all of the actuators.

5 Claims, 2 Drawing Figures

HELICOPTER SWASHPLATE CONTROLLER

FIELD OF THE INVENTION

This invention relates to helicopters, and more particularly, to systems for controlling the orientation of a helicopter swashplate.

BACKGROUND OF THE INVENTION

Helicopter swashplate control comprises the control of the orientation of the swashplate for the main rotor. This swashplate has one degree of translational freedom, referred to as "collective", and two degrees of rotational freedom, referred to as "roll" and "pitch". Generally, control of the swashplate orientation requires the specification of the orientation of a plane in space. Since three non-colinear points specify a plane, the conventional method of swashplate control has employed three non-colinear hydraulic actuators which are controlled independently to achieve the positions that define the desired orientation of the swashplate.

Redundant actuation systems have been developed for the control of helicopter swashplates. The redundancy is employed to improve reliability and survivability. In the prior art systems redundancy has been introduced either by employing more than one hydraulic ram piston to drive each of the three control shafts (force-summing), or by using more than one control valve to regulate a single ram piston driving each control shaft (redundant secondary stage). Both of these techniques concentrate all of the actuating hardware at three positions on the swashplate, thereby limiting the ability of the swashplate controller to survive physical damage and certain hardware malfunctions, such as may be caused by fatigue, failure of the control shaft, or a seized ram piston.

A somewhat different mode of swashplate control has recently been suggested to circumvent these apparent disadvantages, see Corlock, G., et al., "STAR Flight Control System", presented at the Helicopter Flight Control Meeting of the American Helicopter Society, October 1978. This system consists of five actuators coupled symmetrically around the swashplate to form a "star" pattern, thereby allowing for swashplate orientation control by the remaining actuators in the presence of as many as two inoperative actuators. The suggested control law by-passes all but three actuators at all times. A selection logic scheme detects inoperative actuators, which are subsequently by-passed at all times. The controller commands the remaining three actuators to achieve the desired positions, in a manner similar to a conventional controller.

Which this system overcomes many of the disadvantages of the previous systems, it is possible to have substantial asymmetry in the loading pattern of the three controlled actuators under certain conditions (for example, when two adjacent actuators have failed). Under such conditions, relatively high loading is present for individual actuators, which tends to increase the possibility of additional failures. Furthermore, the non-uniformity of the actuator control system precludes the use of powerful comparison testing strategies for fault detection and makes necessary the use of less reliable self-test techniques for this purpose. In addition, the by-passed actuators may be subject to undesirable start-up transients when they are used to replace one of the originally selected active actuators in the control logic.

Accordingly, it is an object of the present invention to provide an improved redundant helicopter swashplate control system.

It is another object of the present system to provide an improved helicopter swashplate control system which optimally distributes the load among component actuators.

It is yet another object of the present invention to provide an improved helicopter swashplate control system minimizing actuator transients.

SUMMARY OF THE INVENTION

Briefly, a redundant control system for a helicopter swashplate includes five or more non-colinear hydraulic actuators coupled to the swashplate. All of the actuators, so long as they are operative, are actively controlled in a manner so that swashplate control is maintained with a minimum expenditure of hydraulic energy.

Each of the actuators includes a hydraulic ram which is responsive to a command signal for that ram. Each actuator also includes an associated first transducer for generating a ram position signal representative of the position of its ram, and in addition, includes a second transducer for generating a ram differential pressure signal representative of a differential pressure across the ram.

A controller is responsive to the ram differential pressure signals from all of the actuators and generates a reference differential pressure signal for each of the actuators which is a linear combination of the respective ram differential pressure signals.

Generally, the generated command signal for each ram is the sum of two parts dependent upon: (1) the difference between the ram position signal for that ram and a signal representative of a reference position for that ram, and (2) the difference between the ram differential pressure signal for that ram and the reference differential pressure signal for that ram.

In the preferred form, the reference differential pressure signals for the respective rams are minimum norm transformations of the sensed ram differential pressure signals.

In some forms of the invention, the system includes detectors for detecting malfunctioning hydraulic actuators and for deleting those from the system. In some forms, an actuator is identified as being malfunctioning when the difference between the reference differential pressure and the ram differential pressure for that actuator exceeds a predetermined threshold value.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
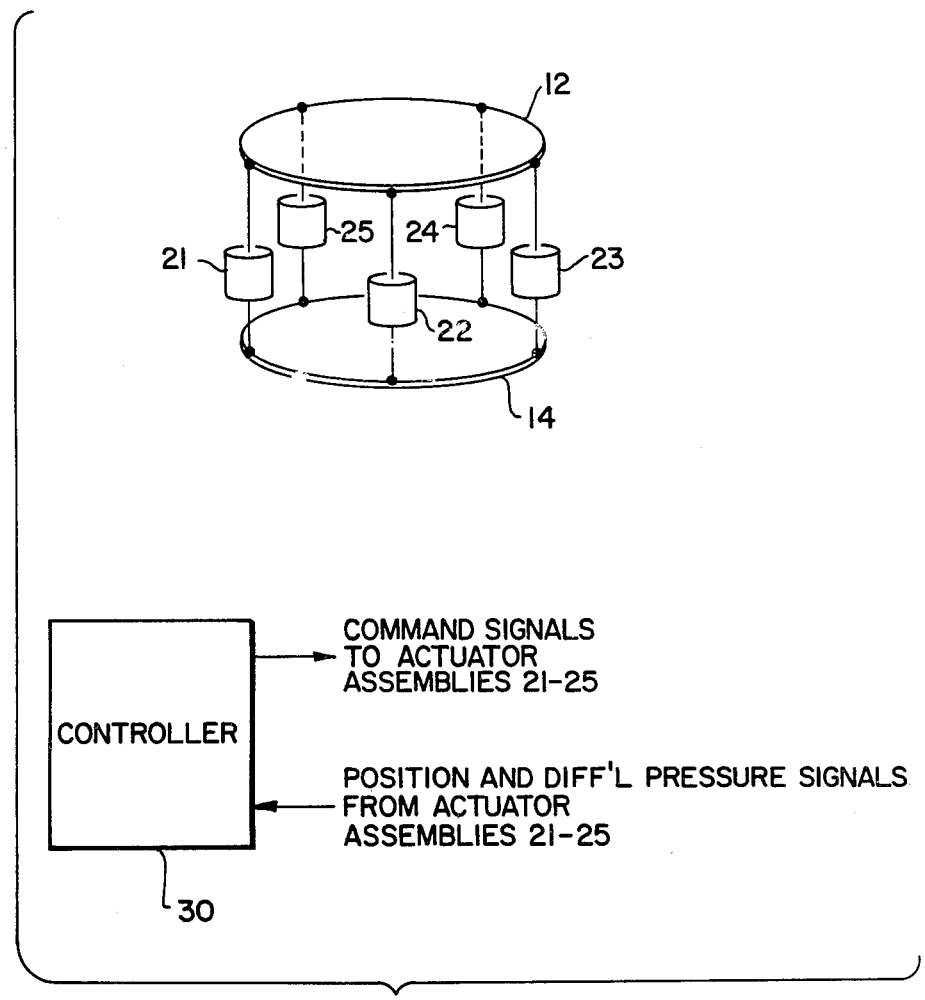
FIG. 1 shows an exemplary system embodying the present invention.

FIG. 1 shows an embodiment of the present invention which is adapted for controlling the spatial orientation of the fixed ring 12 of a rotor rise/fall swashplate. FIG. 1 shows the swashplate fixed ring 12 which is coupled to the perimeter portion of the upper transmission case 14 by way of actuator assemblies 21, 22, 23, 24 and 25. By way of example, the actuator assemblies 21–25 may have the same general form as those disclosed in the Carlock, et al. paper referenced above.

Each actuator assembly includes associated transducers which provide signals representative of the sensed position of the respective actuator and the differential pressure across the ram of that actuator. A controller 30 is responsive to the position and differential pressure signals from the various actuator assemblies to generate command signals for those actuator assemblies. A controller 30 includes a portion associated with each actuator which is responsive to the sensed and reference position signals for that actuator and also to the differential pressure signals from all of the operative actuators.

Figure 2:
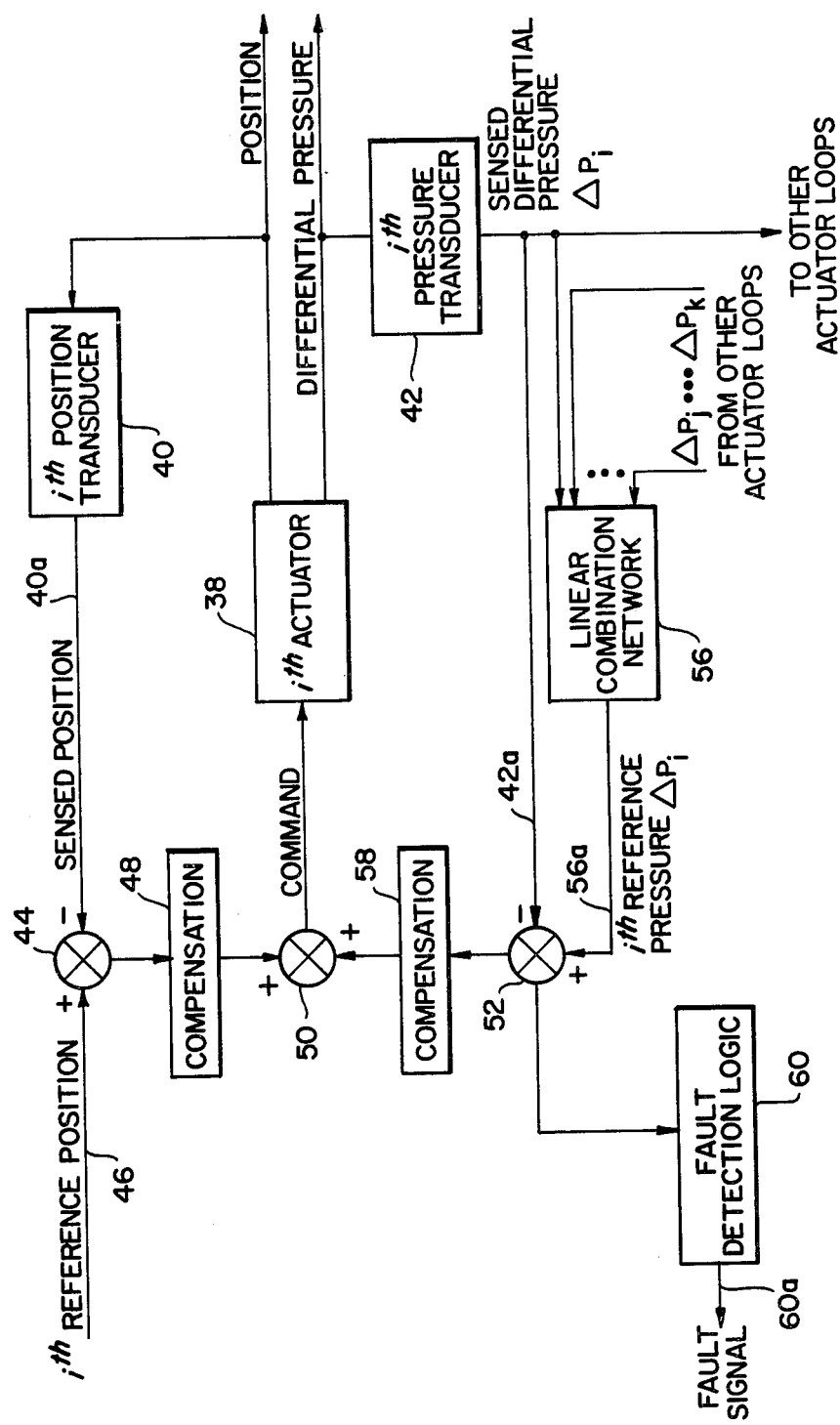
FIG. 2 shows in block diagram form, a portion of the controller of the system of FIG. 1.

FIG. 2 shows in block diagram form, the portion of the controller associated with the $i^{th}$ actuator (denoted by reference designation 38). Controller 30 includes a similarly configured portion for each additional actuator in the system. In FIG. 2, the $i^{th}$ actuator 38 is coupled to an associated position transducer 40 and an associated differential pressure transducer 42. The position transducer 40 provides a signal on line 40a which is representative of the sensed position for actuator 38. That signal is applied to a summing network 44. A reference position for the $i^{th}$ actuator is applied on line 46 to the other input of the summing network 44. The summing network 44 generates a difference signal which is applied by way of a compensation network 48 and a command summing network 50 to the input of actuator 38.

The differential pressure transducer 42 provides a signal $P_i$ on line 42a which is representative of the differential pressure across the ram of actuator 38. The sensed differential pressure signal for the $i^{th}$ actuator provided by differential pressure transducer 42 is also applied to a linear combination network 56 for the $i^{th}$ actuator, as well as to a corresponding linear combination network for the remaining actuators in the system. Similar P signals from the pressure transducers of those remaining actuators are also applied to the linear combination network 56 for the $i^{th}$ actuator. Network 56 provides a reference differential pressure signal on line 56a. The signals on lines 42a and 56a are applied to the differential inputs of a summing network 52. The resultant difference signal is applied by compensation network 58 and command summing network 50 to the command input of the actuator 38.

The difference signal representative of the difference in signals on lines 42a and 56a, i.e. the differential pressure deviation, is also applied to a fault detection logic network 60. The network 60 provides an output signal on line 60a which is indicative of the faulty operation of actuator 38 when this difference signal exceeds a predetermined threshold.

The linear combination network 56 uses a linear combination of the sensed differential pressure signals for all of the actuators to provide the reference pressure signal for the $i^{th}$ actuator. The determination of the coefficients in the combination depends solely upon the geometry of the actuators. The coefficients are determined in the following manner. Where the number of spatially separate actuators in the system, N, is greater than or equal to 5, a 3×N matrix C is defined to consist of a first row composed entirely of 1's with the remainder of each column composed of the two direction cosines specifying the orientation of the actuator with respect to a pair of fixed reference axes lying in the plane normal to the nominal direction of collective translation. Where $\Delta P$ is the vector of the sensed differential pressures, and the $\hat{\Delta P}$ is the vector of the reference pressures, the minimum norm transformation is given by $$\hat{\Delta P} = C^T[CC^T]^{-1}C\Delta P$$

Thus, $\hat{\Delta P}_i$ for actuator 38 is calculated using the coefficients in the $i^{th}$ row of the matrix $C^T[CC^T]^{-1}C$. The set of reference pressures $\hat{\Delta P}$ then has the property that the resultant forces and torques applied to the swashplate are identical to the resultant of $\Delta P$. Additionally, $\Delta P$ has "minimum norm", i.e. $\hat{\Delta P}$ is the value of $\widetilde{\Delta P}$, which minimizes the quantity $$J = \sum_{i=1}^{N} \widetilde{\Delta P_i^2}$$

where $\widetilde{\Delta P}$ is any set of differential pressures which produce the same resultant forces and torques as $\Delta P$. Since the norm of $\Delta P$ is directly related to the total hydraulic energy that is expended, controlling the actuators to achieve $\hat{\Delta P}$ minimizes this energy expenditure.

As a result, the swashplate control of the present system minimizes the expenditure of hydraulic energy, and possesses the additional desirable feature that all of the available actuators are always active. As a result, the set of pressure differences, or pressure "residuals", $[\Delta P_i - \hat{\Delta P}_i]$ can be employed in a comparison type fault detection scheme. By way of example, the direct comparison of the magnitude of each residual to a threshold value can be used to declare that an actuator has failed whenever this threshold is exceeded. In addition, since all actuators are active, hydraulic start-up problems, such as may arise when the use of an actuator is discontinued due to a detected malfunction, are eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A control system for a helicopter swashplate, comprising:
  A. five or more non-colinear hydraulic actuators coupled to said swashplate, each of said actuators including a ram responsive to a command signal for that ram and further including associated first transducer means for generating a ram position signal representative of the position of said ram, and second transducer means for generating a ram differential pressure signal representative of the differential pressure across said ram, and command signal generator means for generating said command signal,
  B. a controller means including means responsive to the ram differential pressure signals from all of said actuators for generating a reference differential pressure signal for each of said actuators, wherein said reference differential pressure signals are linear combinations of said ram differential pressure signals, wherein said command signal generator means includes means for generating said command signal for each ram whereby said command signal is representative of the sum of (1) the difference between the ram position signal for that ram and a signal representative of a reference position for that ram and (2) the difference between the ram differential pressure signal for that ram and said reference differential pressure signal for that ram.

2. A system according to claim 1 wherein said reference differential pressure signals are minimum norm transformations of said ram differential pressure signals.

3. A system according to claim 2 wherein $$\hat{\Delta P} = C^T [CC^T]^{-1} C \Delta P$$

where $\hat{\Delta P}$ is a vector representative of said reference differential pressures, $\Delta P$ is a vector representative of said ram differential pressures, and C is a $3 \times N$ matrix having all 1's in its first row, and the remainder of its columns composed of the two direction cosines defining the orientation of the corresponding actuator with respect to a pair of fixed reference axes lying in the plane normal to the nominal direction of the collective translation of said swashplate.

4. A system according to claim 1 further comprising means for detecting malfunctioning ones of hydraulic actuators.

5. A system according to claim 4 wherein said detecting means identifies an actuator as malfunctioning when said difference between the reference differential pressure and the ram differential pressure for that actuator exceeds a predetermined threshold value.

* * * * *